(12) United States Patent
Hathout et al.

(10) Patent No.: US 6,675,074 B2
(45) Date of Patent: Jan. 6, 2004

(54) METHOD AND SYSTEM FOR VEHICLE TRAJECTORY ESTIMATION

(75) Inventors: Jean-Pierre Hathout, Mountain View, CA (US); Markus Klausner, Wexford, PA (US)

(73) Assignee: Robert Bosch GmbH, Stuttgart (DE)

( * ) Notice: Subject to any disclaimer, the term of this patent is extended or adjusted under 35 U.S.C. 154(b) by 10 days.

(21) Appl. No.: 09/934,423

(22) Filed: Aug. 21, 2001

(65) Prior Publication Data

US 2003/0040849 A1 Feb. 27, 2003

(51) Int. Cl.$^7$ .......................... G06F 17/00; G01C 21/00
(52) U.S. Cl. ................. 701/1; 701/207; 342/357.14
(58) Field of Search ................. 701/1, 71, 75, 701/82, 89, 207; 342/357.14

(56) References Cited

U.S. PATENT DOCUMENTS

| | | | | |
|---|---|---|---|---|
| 5,732,377 A | * | 3/1998 | Eckert | 701/83 |
| 5,790,970 A | | 8/1998 | Brachert et al. | 701/70 |
| 5,878,357 A | * | 3/1999 | Sivashankar et al. | 701/1 |
| 6,219,609 B1 | * | 4/2001 | Matsuno et al. | 701/72 |
| 6,366,833 B1 | * | 4/2002 | Fukuyama | 701/1 |
| 6,427,102 B1 | * | 7/2002 | Ding | 701/34 |

OTHER PUBLICATIONS

Van Zanten et al., *VDC, The Vehicle Dynamics Control System of Bosch*, 1995, pp. 8–26.
Van Zanten et al., *Vehicle Stabilization by the Vehicle Dynamics Control System ESP*, 1$^{st}$ IFAC–Conference on Mechatronic Systems, Darmstadt, Germany, vol. 1, 2000, pp. 95–102.
Arborio, et al., *Vehicle Dynamics and Stability Analysis With Matlab and Adams Car*, Torino, Italy, 2000.
Zvi Shiller, *Optimization Tools for Automated Vehicle Systems*, California PATH Working Paper, University of California, Los Angeles, Jul. 1995, pp. 1–24.
G. Edzko Smid, *Virtual Vehicle Systems Stimulation—A Modulator Approach in Real–Time*, Automotive Research Center, 2000.
T.D. Gillespie, *Fundamentals of Vehicle Dynamics*, Society of Automotive Engineers, Inc., 1999.*

* cited by examiner

*Primary Examiner*—Tan Q. Nguyen
(74) *Attorney, Agent, or Firm*—Kenyon & Kenyon (57) ABSTRACT

In a method and system for estimating a trajectory of a vehicle having an Electronic Stability Program (ESP), sensor data pertaining to dynamics of the vehicle is obtained, and an estimate of the trajectory of the vehicle is calculated using the sensor data and vehicle dynamics parameters estimated by the ESP. The acquisition of the sensor data and the calculation of vehicle trajectory estimates occur independently of any external signal communication infrastructure-based trajectory estimation tools.

24 Claims, 5 Drawing Sheets

METHOD AND SYSTEM FOR VEHICLE TRAJECTORY ESTIMATION

FIELD OF THE INVENTION

The present invention relates to automobile electronic control systems, and relates more particularly to a method and system for providing real-time estimation of the trajectory of a vehicle that is equipped with an Electronic Stability Program (ESP).

BACKGROUND INFORMATION

At present, automobile engineers and manufacturers are designing and implementing vehicle trajectory estimation systems that calculate and store data from which the trajectory a vehicle takes during travel can be estimated and reconstructed. Accurate vehicle trajectory estimation can be used in vehicle performance testing and accident reconstruction, among other applications. Typically deployed vehicle trajectory estimation systems utilize either an external signal communication infrastructure, such as the Global Positioning System (GPS), or specialized additional equipment such as gyroscopes, accelerometers and wheel tachometers that directly measure wheel dynamics. The systems which use an external signal communication infrastructure determine vehicle position in approximate real-time via a process of triangulation based upon varying reception times of radio waves broadcast by various GPS satellites and/or cellular antennas operating in the region of the vehicle. It has been found that the update rates of such systems can be too slow for precise continuous trajectory estimation. In addition, the position accuracy provided by such systems may be too low depending on the level of precision required, and signals may be corrupted, discontinuous or unavailable due to contingencies such as presence of tunnels and extreme weather conditions. Furthermore, systems that use additional measurement equipment often suffer from inaccuracies due to sensor drift and sensor output bias.

Recently developed automobile safety systems such as Anti-Lock Braking Systems (ABS) and Vehicle Dynamics Control Systems (VDC, also known as Electronic Stability Program (ESP)) have been incorporated in many automobile models. As the article "*VDC, The Vehicle Dynamics Control System of Bosch*" by A. van Zanten et al. (1995) describes, Vehicle Dynamics Control systems are equipped with sensors that detect various primary dynamic parameters, such as the yaw rate ($\dot{\psi}$), the lateral acceleration ($a_y$), and wheel speed ($v_{wh}$), as well as driver-controlled parameters such as the steering wheel angle and the brake pressure. From the detected primary parameters, an Electronic Stability Program (ESP) estimates various quantities pertaining to the real-time dynamics of the vehicle, and from these quantities, determines whether to implement automatic controls. For example, during certain unsafe driving conditions, such as a sharp turn on a slippery surface, the ESP may determine from the estimated vehicle dynamics that special control measures are necessary for lateral and longitudinal stability of the vehicle. In such cases, the ESP automatically activates engine and/or brake elements which alter the dynamics of the vehicle so as to increase vehicle safety.

In accomplishing the complex adjustments involved in adapting to various unsafe driving conditions, the ESP derives and estimates using the primary detected parameters, several dynamics parameters that are not readily measured by available sensors, such as the longitudinal acceleration of the vehicle, wheel-to-surface friction coefficients, wheel slip angles and slope angles. Since ESP controller sampling rates are on the order of 50 Hz, vehicle dynamics parameter estimates can be updated in near real-time. In addition, the ESP uses feedback from the derived estimates to correct for drift in the sensors and for additional bias due to sloped road conditions.

It is known in the art that a vehicle's trajectory over time can be calculated as a function of the vehicle dynamics parameters if there is a full and accurate set of parameters for each near-instant of time. Given the high accuracy provided by the self-correcting mechanisms in ESP systems, and the relatively fast sampling rate at which ESP controllers make direct measurements and derive estimates of the vehicle dynamics parameters, it would be advantageous to selectively harness the capabilities of the ESP in order to generate a continuous vehicle trajectory estimation.

SUMMARY OF THE INVENTION

It is therefore an object of the invention to estimate the trajectory of a vehicle equipped with an Electronic Stability Program (ESP) using the dynamics parameter detection and estimation functions provided by the ESP.

In accordance with the desired object, the present invention provides a method for estimating a trajectory of a vehicle equipped with an ESP under both normal and abnormal driving conditions, such as wet or icy roads, sharp turns at high speed, uneven terrain, etc. According to the method, sensor data pertaining to the dynamics of the vehicle is obtained, and an estimate of the trajectory of the vehicle is calculated based upon the sensor data and estimates of vehicle dynamics parameters made by the ESP. The acquisition of the input data and the calculation of the estimates are performed independently of any external signal communication infrastructure-based trajectory estimation tools.

In an exemplary embodiment, the sensor data is communicated by sensors that are readily available in commercial vehicles, such as a yaw rate sensor and a lateral acceleration sensor. The sensor data, comprising input data to the ESP, forms the basis for estimation of a wide range of vehicle dynamics parameters that are either not readily measurable in the vehicle (such as the longitudinal acceleration), or cannot currently be directly measured in the vehicle (such as wheel coefficients of friction, wheel slip angles, etc.). These estimated vehicle dynamics parameters are in turn used to compute the real-time position of the vehicle with respect to a stationary reference frame.

The method according to the present invention also increases the accuracy of trajectory estimates by providing for high sampling and update rates, and by compensating for sensor drifts using observed dynamics parameter estimates computed by the ESP. The fast sampling rates allow real-time computation of the vehicle trajectory, up to the limit of the ESP controller cycle, thereby providing a sampling rate adequate for the bandwidth of vehicle motion even in extreme driving conditions.

In addition, the present invention provides a procedure for obtaining the trajectory of a vehicle. According to a first embodiment, a vehicle equipped with an ESP obtains sensor data for an instant in time, computes related vehicle dynamics parameters, and from these data sources, estimates the position of the vehicle at that instant in time. The estimated position is then recorded either internally or externally. The trajectory is then assembled from the time series of recorded positions, which time series has a total duration T.

According to a second embodiment, a vehicle equipped with sensors (with or without an ESP) obtains and records sensor data at a number of instants of time over a duration T. The recorded sensor data is thereafter input to an ESP which may be internal or external to the vehicle. The estimation of vehicle dynamics parameters and the calculation of positions may occur in near real time, while the vehicle is in operation, or it may occur subsequently, when the vehicle is no longer in operation.

The method and system for vehicle trajectory estimation provided by the present invention can be advantageously used in numerous applications including, but not limited to: vehicle accident reconstruction, various testing of vehicle maneuverability and maneuver reconstruction, a stand-alone vehicle tracking system and/or an enhancement to future GPS systems that may have faster sampling rates and higher accuracy. When used in conjunction with GPS systems, the method and system of the present invention can be particularly advantageously applied when GPS updates are lost due to, for example, severe weather conditions, or driving in tunnels. Moreover the present invention can be usefully applied to pre-defined trajectory tracking for autonomous vehicles. By pre-defining the trajectory, the ESP can use the inverse of the equations used to compute the trajectory to calculate the dynamics parameters required to control the vehicle to follow the pre-defined trajectory.

DETAILED DESCRIPTION

The present invention provides a method and system for combining the signals measured by the VDC system, such as the yaw rate and lateral acceleration, with dynamic states estimated by the ESP, such as the longitudinal acceleration and velocity, to accurately compute the position of the center of mass of the vehicle as well as its heading in a defined coordinate system over time. In each measurement cycle, the vehicle position is computed over a time period T, which comprises sub-intervals beginning at a starting reference point $t_o$ and ending at $t_n$.

Figure 1:
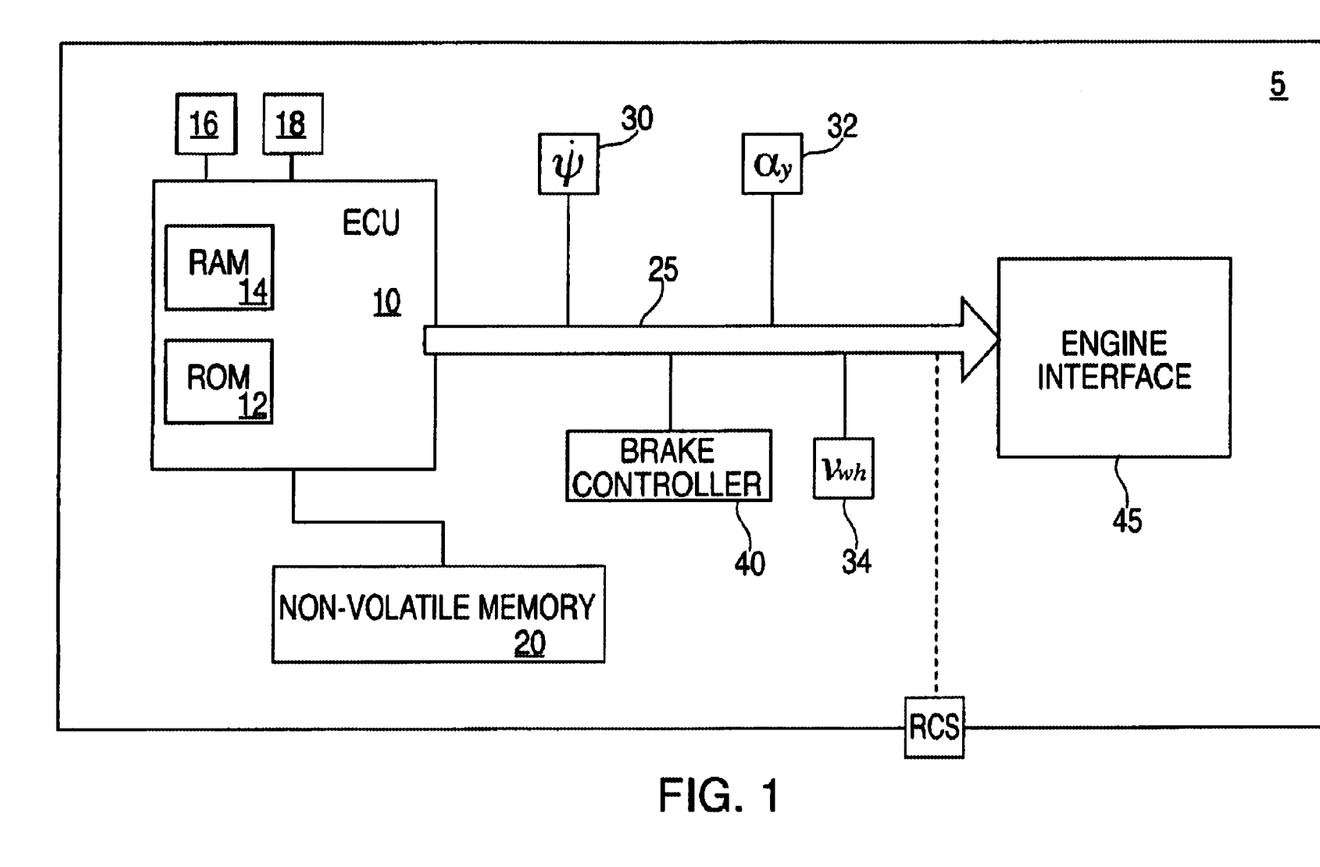
FIG. 1 shows a schematic block diagram of a VDC control system in an automotive vehicle that executes an Electronic Stability Program (ESP) according to the present invention.

FIG. 1 schematically illustrates an exemplary VDC system in an automotive vehicle. It should be noted that the system shown is vastly simplified in comparison to actual VDC systems, and only relevant components are shown. As shown, a VDC system 5 includes an Electronic Controller Unit ("ECU") 10 that may be implemented, for example, as a microprocessor. The ECU 10 further includes one or more Read Only Memory (ROM) units shown schematically as a single ROM unit 12, and one or more Random Access Memory (RAM) units also shown as a single RAM unit 14. The ROM units 10 store algorithms and data that collectively comprise the Electronic Stability Program (ESP). As noted above, and described in further detail below, the ESP receives primary input data and uses the input data to calculate various vehicle dynamics parameters, the values of which allow the ECU 10 to determine whether challenging driving conditions exist. If such conditions are present, the ECU 10 controls vehicle actuators to automatically adjust the vehicle to the driving conditions so as to promote safety. During a series of complex computations by which the vehicle dynamics parameters are determined, the ECU 10 may store the primary data, intermediate values and the determined dynamics parameters in the RAM units 14. In addition, as will be discussed further below, any of the primary data, intermediate values and determined dynamics parameters may be stored in (and/or transferred to) a non-volatile memory 20, which may implemented, for example, as EEPROM memory such as flash memory that retains data during and after power outages. The non-volatile memory 20 may be a singular or distributed entity, and may be co-located with the ECU 10 or it may be located at any node coupled to the VDC system 5 of the vehicle. In addition, if a remote communication unit is coupled to the VDC system 5, data received and computed by the ECU 10 can be transmitted to a remote site in real-time, or when the vehicle is stationary (offline).

Various active control sensors 16, 18 (of which there may be a plurality, but only two are shown) are directly coupled to the ECU 10 and communicate signals pertaining to the active (driver) control of the vehicle such as the steering wheel angle, brake pressure and gas pedal pressure (i.e., the intended vehicle velocity and acceleration). The information obtained from these sensors 16, 18 comprises part of the primary data received and used by the ESP. The ECU 10 is also coupled to a high-capacity data bus 25, via which it also receives and transmits data. As shown, a yaw-rate sensor 30, which may be of the metal-cylinder type, for example, is directly coupled to the data bus 25. The yaw rate sensor 30 directly measures the rotational speed of the vehicle about the vertical axis of the sensor. A lateral acceleration sensor 32, also directly coupled to the data bus 25 and which may include a magnet and a linear Hall element, measures the acceleration (at the sensor) in the lateral direction, perpendicular to the front-back axis of the vehicle. For purposes of illustration, a single wheel speed sensor (e.g., a tachometer) 34 is shown coupled to the data bus 25, which should be taken to represent one sensor for each wheel of the vehicle. Each wheel speed sensor 34 measures the actual speed of the wheel, which may vary from the vehicle speed due to wheel slip. Each of the sensors 30, 32, 34 transmits detected signals through the data bus 25 to the ECU 10.

The data bus 25 also couples the ECU 10 to actuators to enable automatic control of vehicle operation. Coupled to the data bus 25 are a brake controller 40, which may be implemented as a hydraulic system for converting signals generated from the ECU 10 into appropriate mechanical brake functions at various wheels, and an engine interface 45. Through the engine interface 45 (and via the data bus 25), the ECU 10 receives data pertaining to engine conditions, and controls various engine parameters, such as throttle valve angles, in order to change the amount of torque delivered by the engine to the vehicle.

Figure 2:
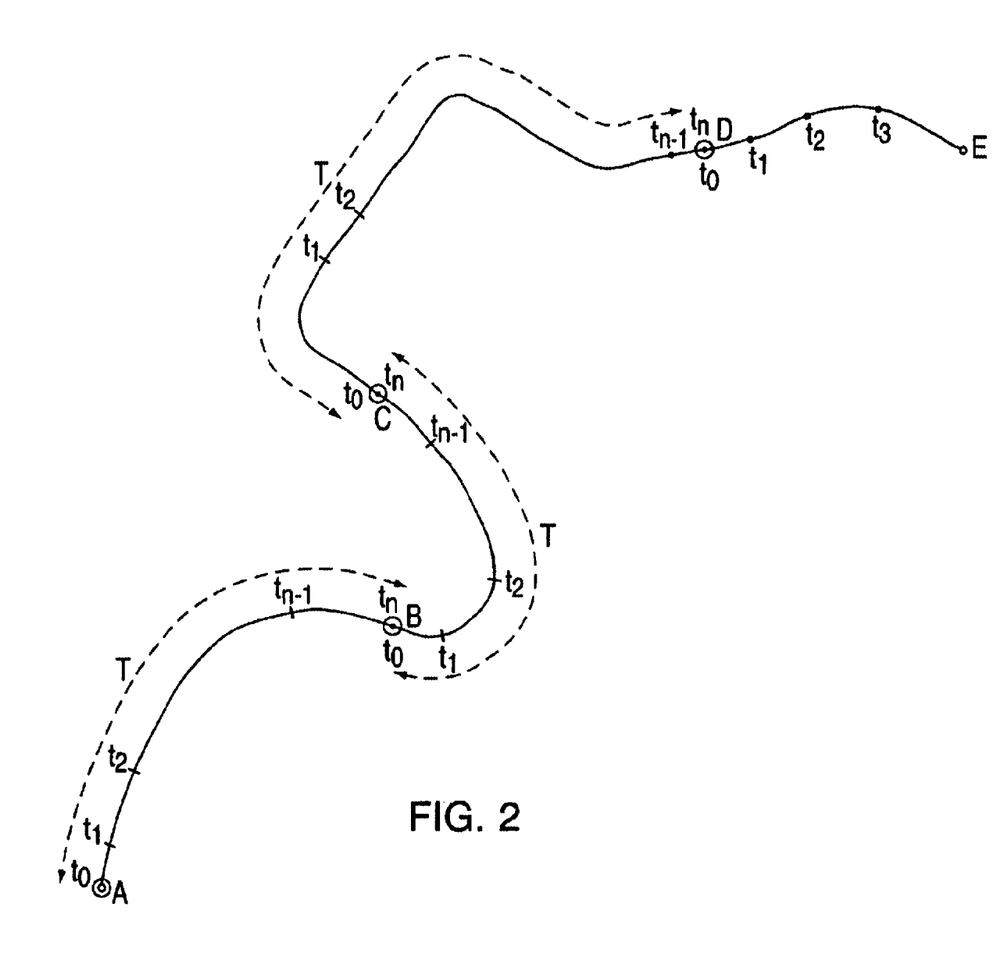
FIG. 2 illustrates an exemplary path of a vehicle over time, and indicates how the starting reference point changes after each cycle period ends.

The trajectory of the vehicle is estimated by the ECU 10 from calculation based on the signals it receives from the various sensors 30, 32, 34 of the vehicle. According to one embodiment of the present invention, the trajectory estimation occurs over a period of time T, beginning from a starting location. Once the time period T elapses, the end point of the first trajectory becomes the starting point of a new trajectory for a new time period of length T. In other words, each starting point is the origin of the reference coordinate system for the corresponding trajectory for a time period T. FIG. 2 illustrates an exemplary path of a vehicle over time, and indicates how the starting reference point changes after each cycle period ends. As shown, a vehicle starts at point A and travels in a northeasterly curve to a point B over time T. As the vehicle travels from point A to point B over time T, dynamics parameters are detected and trajectory estimations are calculated at time increments, $t_1, t_2 \ldots t_{n-1}, t_n$, so that the trajectory over time T consists of a time series of n discrete points located in space with respect to a starting reference frame having an origin at A. The time interval between successive trajectory points depends upon ECU 10 update capability and may be as low as 20 milliseconds, for example.

As shown in FIG. 2, when a vehicle has traveled for a time period T after starting from point A, the vehicle is located at point B. Point B then becomes the origin of an inertial reference frame for the next time period T. Over this subsequent period, the vehicle travels in a northwesterly curve towards point C with data again taken at time increments $t_1, t_2 \ldots t_{n-1}, t_n$. From point C, the inertial frame shifts after travel duration T to point D and finally to point E, which is a final point along the vehicle's trajectory in the example shown in FIG. 2. In this manner, the inertial reference frame for calculation of the vehicle's trajectory shifts over time, and each single "trajectory" segment, corresponding to time period T, includes only the portion of the total travel path covered starting from the respective starting reference point. The gathered trajectory data may be stored in several ways. Each data point $t_i$ may be calculated and then immediately stored in one or more non-volatile memory nodes 20, or the ECU RAM 14 may store an entire trajectory, e.g., from point B to point C, and then transfer the entire trajectory data for non-volatile memory storage when the vehicle reaches point C and the reference point switches to C. It is advantageous for the ECU RAM 14 to store data pertaining to the current reference coordinate system, i.e., data for a given time period T, and to transfer the trajectory data for the given period T at the end of the given period T.

Figure 3:
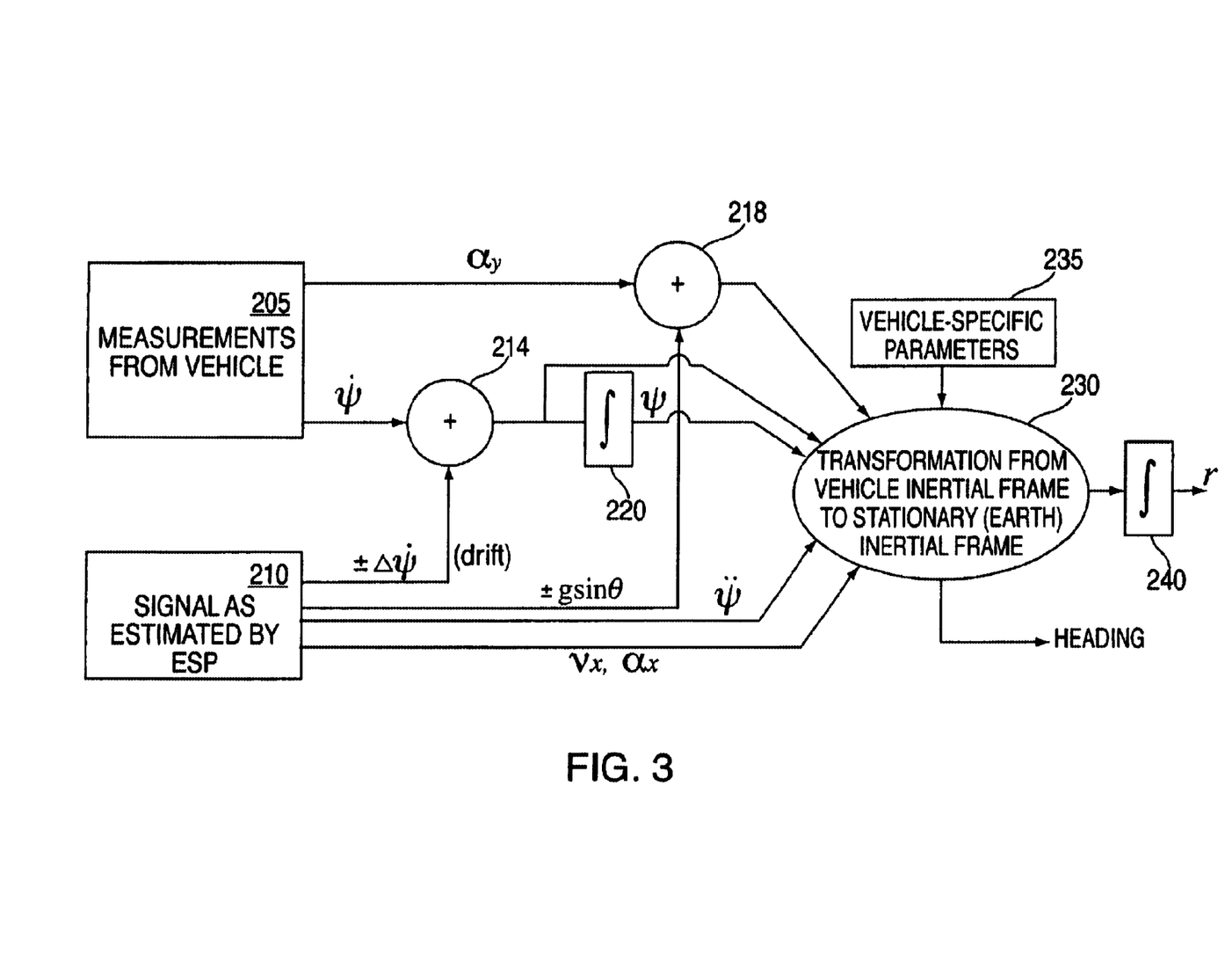
FIG. 3 is a functional diagram of an exemplary embodiment of the method for vehicle trajectory estimation according to the present invention.

FIG. 3 illustrates, in a functional block diagram, one embodiment of the method for vehicle trajectory estimation according to the present invention. As shown in FIG. 3, block 205 represents direct measurements from a vehicle, which measurements used in the algorithm may be the yaw rate ($\dot{\psi}$) from the yaw rate sensor 30 and the lateral acceleration ($a_y$) from the lateral acceleration sensor 32. In addition, block 210 represents which signals include several estimated dynamics parameters, e.g., the longitudinal acceleration and velocity ($a_x$, $v_x$), the yaw acceleration ($\ddot{\psi}$), yaw sensor drift ($\Delta\dot{\psi}$), and the slope offset (g sin θ) (where g is the gravitational constant and θ is the slope angle). As represented by summation block 214, the yaw rate from block 205 and the sensor drift from block 210 are optionally added to correct the measured yaw rate, and as represented by block 218, the lateral acceleration from block 205 is combined with the slope angle offset from block 210 to form a corrected lateral acceleration. Furthermore, as represented by integration block 220, the corrected yaw rate is numerically integrated over the time of the trajectory, yielding a current yaw angle ($\psi$).

Each of the corrected lateral acceleration, the corrected yaw rate, the integrated yaw angle, the yaw acceleration and the longitudinal acceleration and velocity are communicated to transformation block 230, which performs a coordinate transformation from the moving vehicle frame to a stationary reference frame, for example, the earth. The transformation block 230 also incorporates information received from the vehicle-specific parameters block 235 concerning the offset of the yaw rate and lateral acceleration sensors 30, 32 from the center of gravity of the vehicle. As an example of such a transformation, the coordinate transformation for the lateral acceleration in the earth stationary reference frame, can be computed as $$a_{y(inertial)} = (a_y - \ddot{\psi} l_{cx} + \dot{\psi}^2 l_{cy})\cos(\psi) + (a_y - \ddot{\psi} l_{cy} + \dot{\psi}^2 l_{cx})\sin(\psi) \pm g \sin(\theta) \qquad (1)$$

where $l_{cx}$ and $l_{cy}$ denote the distances of the lateral acceleration sensor from the center of gravity of the vehicle in the respective longitudinal and lateral directions. The other dynamics parameters, both directly measured and estimated, are also transformed using similar coordinate transformation functions which are known in the art.

The transformation block 230 delivers the transformed dynamics parameters to a trajectory integration block 240, where x and y components of trajectory vector r (=sum of $r_x$ and $r_y$) are computed by double integration over cycle time T of the estimated longitudinal acceleration ($a_x$) and the measured lateral acceleration ($a_y$):

$$r_x = \int\int a_x (dt)^2, r_y = \int\int a_y (dt)^2 \qquad (2)$$

The vector addition of the x and y components provides the position of the vehicle in the inertial x-y plane during any of the sampled points $t_i$ during period T. The heading of the vehicle—the direction in which the vehicle is pointing at a given time—is also computed at each sampled point by the yaw angle ($\psi$) computed from integration block 220.

It is emphasized that the above-described method for estimating the trajectory of a vehicle represents only one embodiment of the invention, as there are many other dynamics parameters, e.g., the body slip angle, which may be estimated in block 210 and then used to further derive the trajectory and/or heading of the vehicle. The body slip angle may be interpreted as the angle between the instantaneous heading of the vehicle and its actual trajectory. Under certain conditions, for example, when the vehicle is spinning on a low friction surface such as ice, the instantaneous heading of the vehicle is decoupled from its actual trajectory. According to the well-known equation for the rate of change of body slip angle (β), e.g., from "*Fundamentals of Vehicle Dynamics*" by T. D. Gillespie, $$\dot{\beta} = \frac{1}{1+\beta^2} \cdot \left\{ \frac{a_y}{v} - \dot{\psi} - \beta \cdot \frac{a_x}{v} - \beta^2 \cdot \dot{\psi} \right\} \qquad (3)$$

the body slip angle can be estimated (for small slip angles) by integrating the above equation over time, yielding:

$$\beta(t) = \beta_0 + \int_0^t \left\{ \frac{a_y}{v} - \dot{\psi} \right\} dt \qquad (4)$$

where v is the absolute velocity of the vehicle. Thus, from the yaw rate, the lateral acceleration and estimated vehicle velocity (lateral and longitudinal), the heading of the vehicle under small slip-angle condition can be estimated via equation (4).

Figure 4A:
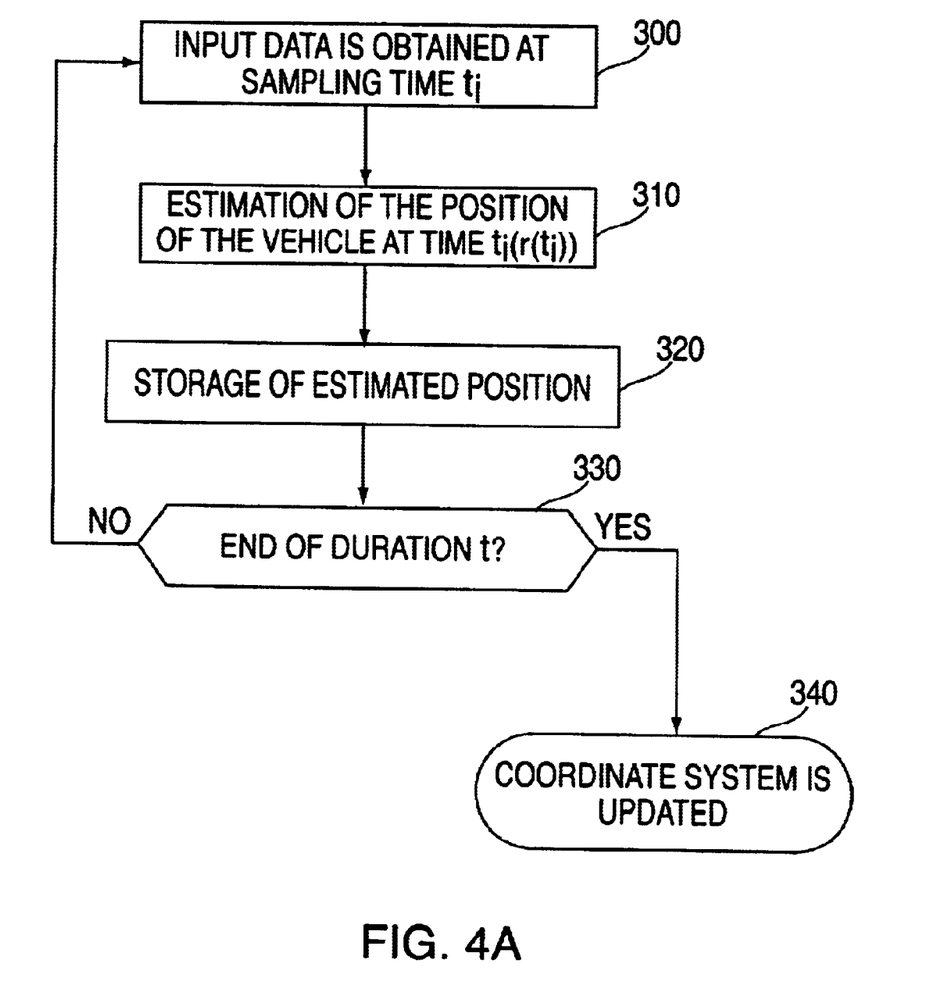
FIG. 4A is a flow chart of one method for obtaining the trajectory of a vehicle according to the present invention, in which method the vehicle trajectory is computed in real-time in the vehicle.

As briefly described above, the trajectory estimation can be made in real-time (online) or when the vehicle is not running (offline), and can be made either in the vehicle itself or at a remote location. In one method according to the present invention, illustrated as a flow chart in FIG. 4A, the vehicle trajectory is computed in real-time in the vehicle. In step 300, input data is obtained at sampling time $t_i$. The ECU 10 then (in step 310) derives dynamics parameters and estimates the position of the vehicle in an appropriate coordinate system at a time $t_i$ ($r(t_i)$). The calculated position is then stored in step 320 within the ECU 10 or at one or more non-volatile memory nodes 20, or is delivered via a remote communication system transmitter to a remote data storage location. Steps 300, 310 and 320 are repeated (step 330) for subsequent sampling points $t_{i+1}$, $t_{i+2}$ until the end of the duration T (step 340), at which point the reference coordinate system is updated.

Figure 4B:
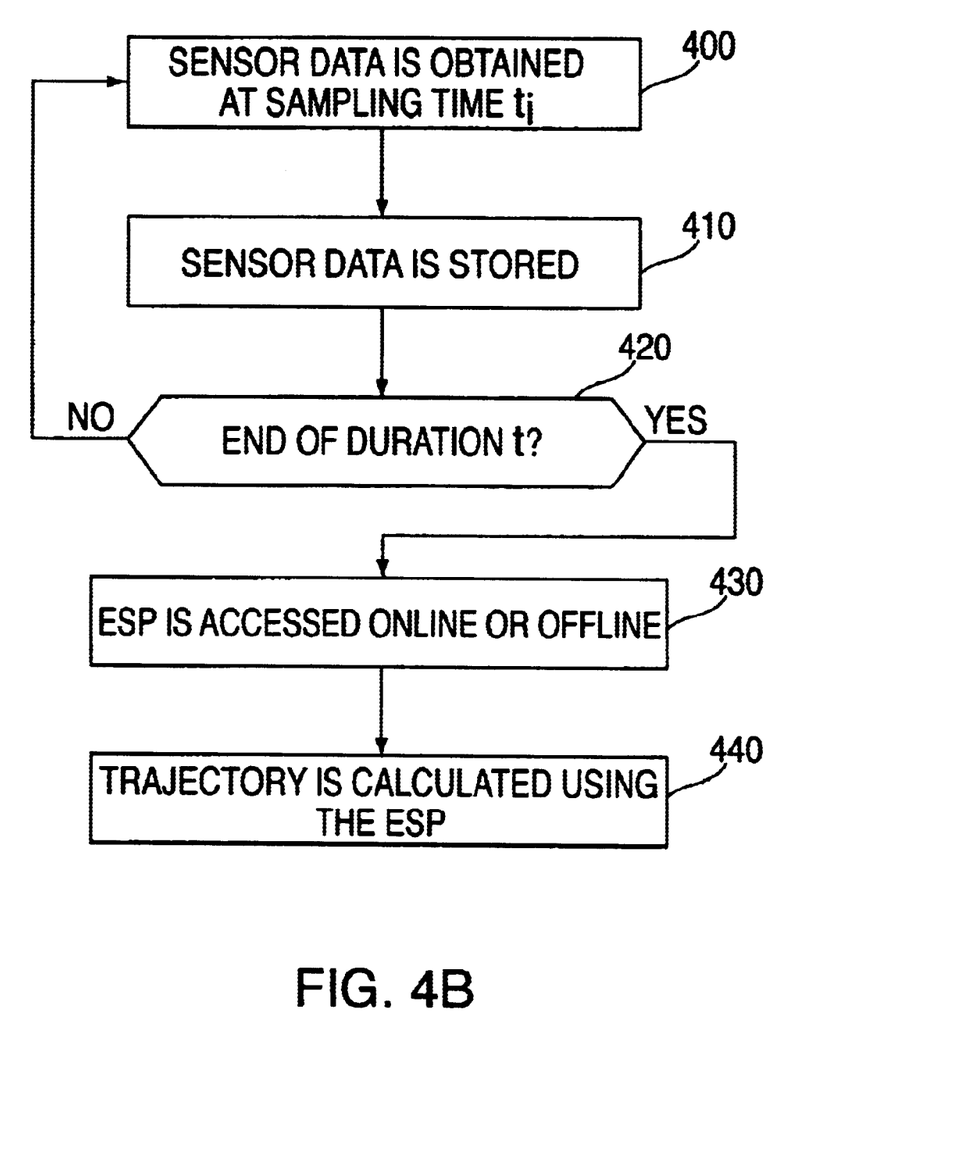
FIG. 4B is a flow chart of another method for obtaining the trajectory of a vehicle according to the present invention, in which method the vehicle trajectory is not calculated in real-time.

A second embodiment of the trajectory estimation method according to the present invention is shown in FIG. 4B. In step 400, input data is obtained during vehicle operation at sampling time $t_i$, and the input data, rather than the trajectory, is stored (step 410) internally or externally. A time series of data is obtained and stored until the end of the duration T (step 420), at which point the coordinate system is updated. The input-data storage location, as noted, may be the ECU 10, one or more non-volatile storage nodes 20 within the VDC system 5, or it may be an external storage location. Regardless of the particular storage implementation, in step 430 the input-data storage location accesses the ESP at the ECU 10 (or at an external processor that also stores and executes an ESP equivalent to the vehicle program) to calculate the trajectory (step 440). In the second embodiment the trajectory is not calculated in real time, providing for trajectory estimation and reconstruction either while the vehicle is in operation or after operation of the vehicle ends. Moreover, locally stored data can be transferred from the ECU 10 or storage nodes 20 to an external analysis station that may be coupled to the ECU 10, or include its own ESP. The analysis station may also include a display apparatus and a geographical database. This combination may provide for a realistic or semi-realistic illustration of the actual trajectory of the vehicle on a road section or open space upon which it traveled.

In the foregoing description, the method and system of the present invention have been described with reference to a number of examples that are not to be considered limiting. Rather, it is to be understood and expected that variations in the principles of the method and apparatus herein disclosed may be made by one skilled in the art, and it is intended that such modifications, changes, and/or substitutions are to be included within the scope of the present invention as set forth in the appended claims. For example, the trajectory estimation algorithm is not limited to using only the ESP estimates described. Other estimated states and parameters could also be used as vehicle maneuvers become more critical. Also, estimates could be replaced with measurements as they become available.

What is claimed is:

1. A method of estimating a trajectory of a vehicle having an Electronic Stability Program (ESP), the method comprising the steps of:
    obtaining sensor data pertaining to dynamics of the vehicle;
    compensating for sensor drift using drift estimates calculated by the ESP; and
    calculating an estimate of the trajectory of the vehicle using the sensor data as compensated for sensor drift, and vehicle dynamics parameters estimated by the ESP;
    wherein the steps of obtaining sensor data and calculating the estimate of the trajectory of the vehicle are performed independently of any external signal communication infrastructure-based trajectory estimation tools.

2. The method according to claim 1, further comprising the step of:
    compensating for sensor bias due to sloped driving conditions by incorporating ESP estimates for a slope angle.

3. The method of claim 2, wherein the sensor data includes yaw rate data and lateral acceleration data.

4. The method of claim 3, wherein the vehicle dynamics parameters estimated by the ESP include at least one of a longitudinal acceleration, a yaw acceleration and a longitudinal velocity.

5. The method of claim 4, further comprising the step of:
    transforming the sensor data and the vehicle dynamics parameters to correspond to an inertial reference frame using vehicle-specific parameters.

6. The method of claim 5, further comprising the step of:
    numerically integrating lateral acceleration data and longitudinal acceleration parameters over time, the integration yielding position values along stationary x and y axes.

7. The method of claim 6, wherein sensor data is obtained according to a sampling rate at a plurality of instants of time beginning at a starting point and ending at an end point after a duration of time T has elapsed after the starting point, the starting point being associated with a first starting position and the end point associated with a first ending position, the position values of the vehicle being calculated at each of the plurality of instants of time in relation to the first starting position, and a vehicle trajectory being assembled for the duration T from the position values associated with each of the plurality of instants of time.

8. The method of claim 7, further comprising the step of:
    when the duration T has elapsed, resetting the first ending position as a second beginning position for obtaining sensor data over another duration of time T.

9. The method of claim 5, further comprising the steps of:
    compensating the yaw rate data for drift; and
    determining a vehicle heading by numerically integrating the yaw rate data over time.

10. The method of claim 3, wherein the vehicle dynamics parameters estimated by the ESP further include at least one of a body slip-angle, yaw sensor drift and slope offset.

11. The method of claim 1, further comprising the steps of:
    estimating the position of the vehicle at each of the plurality of instants in time using the sensor data and the vehicle dynamics parameters;
    recording the position for each of the plurality of instants in time; and
    assembling a trajectory of the vehicle from each of the recorded positions.

12. The method of claim 1, further comprising the step of:
    using the estimate of the trajectory of the vehicle in at least one of vehicle accident reconstruction, testing of vehicle maneuverability, and stand-alone vehicle tracking.

13. A method of estimating a trajectory of a vehicle having an Electronic Stability Program (ESP), the method comprising the steps of:
    obtaining sensor data pertaining to dynamics of the vehicle;
    calculating an estimate of the trajectory of the vehicle using the sensor data and vehicle dynamics parameters estimated by the ESP;

obtaining sensor data at a plurality of instants of time;
recording the sensor data;
when the vehicle is one of online and offline, inputting the recorded sensor data into an ESP;
estimating the position of the vehicle at each of the plurality of instants in time using the sensor data and the vehicle dynamics parameters;
recording the position for each of the plurality of instants in time; and
assembling a trajectory of the vehicle from each of the recorded positions;
wherein the steps of obtaining sensor data and calculating the estimate of the trajectory of the vehicle are performed independently of any external signal communication infrastructure-based trajectory estimation tools.

14. The method of claim 13, wherein the ESP is configured in a device located externally from the vehicle.

15. A method of estimating a trajectory of a vehicle having an Electronic Stability Program (ESP), the method comprising the steps of:
 a) obtaining a yaw rate and a lateral acceleration of the vehicle at an instant in time using sensors;
 b) deriving further parameters pertaining to dynamics of the vehicle using the ESP;
 c) compensating for sensor drift using drift estimates calculated by the ESP;
 d) calculating an estimate of the instantaneous position of the vehicle relative to a stationary coordinate system using the yaw rate, the lateral acceleration and the further parameters as compensated for sensor drift;
 e) repeating steps a) to d) over time; and
 f) assembling an estimation of the trajectory of the vehicle from a series of vehicle positions.

16. The method of claim 15, further comprising the steps of:
 g) calculating a slope angle using the ESP; and
 h) correcting for sensor bias due to sloped driving conditions using the slope angle.

17. The method of claim 15, wherein the further parameters include at least one of a longitudinal acceleration, a body slip-angle, a wheel coefficient of friction, a wheel slip, a yaw acceleration, a longitudinal velocity and a lateral velocity.

18. A method of estimating a trajectory of a vehicle having an Electronic Stability Program (ESP), the method comprising the steps of:
obtaining sensor data pertaining to dynamics of the vehicle;
calculating an estimate of the trajectory of the vehicle using the sensor data and vehicle dynamics parameters estimated by the ESP;
using the estimate of the trajectory of the vehicle in a pre-defined trajectory tracking in an autonomous vehicle; and
calculating vehicle dynamics parameters required to control the autonomous vehicle to follow the pre-defined trajectory using an inverse of equations used to estimate the trajectory;
wherein the steps of obtaining sensor data and calculating the estimate of the trajectory of the vehicle are performed independently of any external signal communication infrastructure-based trajectory estimation tools.

19. A system for estimating a trajectory of a vehicle having an Electronic Stability Program (ESP), comprising:
 an electronic control unit including a RAM unit and a ROM unit, the ROM unit storing the ESP;
 a data bus coupled to the electronic control unit;
 a yaw rate sensor coupled to the data bus for detecting yaw rate data, the yaw rate sensor communicating the yaw rate data to the electronic control unit via the data bus; and
 a lateral acceleration sensor coupled to the data bus for detecting lateral acceleration data, the lateral acceleration sensor communicating the lateral acceleration data to the electronic control unit via the data bus;
 wherein the electronic control unit executes the ESP and calculates vehicle dynamics parameters and computes an estimate of the trajectory of the vehicle using the yaw rate data, the lateral acceleration data and the vehicle dynamics parameters; and
 wherein the electronic control unit compensates for errors caused by sensor drift.

20. The system of claim 19, wherein the electronic control unit compensates for errors caused by sensor drift and sensor bias by incorporating ESP estimates for a slope angle.

21. The system of claim 20, further comprising:
 at least one non-volatile memory unit coupled to the electronic control unit via the data bus;
 wherein the electronic control unit estimates a position of the vehicle at each of a plurality of instants in time using the yaw rate data, the lateral acceleration data and the vehicle dynamics parameters and communicates the position at each of the plurality of instants in time to the at least one non-volatile memory unit, the at least one non-volatile memory unit records each position, and the trajectory of the vehicle is assembled from each of the recorded positions.

22. The system of claim 20, further comprising:
 at least one non-volatile memory unit coupled to the electronic control unit via the data bus;
 wherein the yaw rate sensor obtains yaw rate data at a plurality of instants of time, the lateral acceleration sensor obtains lateral acceleration data at the plurality of instants of time, and the at least one non-volatile memory unit records the yaw rate data and the lateral acceleration data; and
 wherein when the vehicle is one of online and offline, the data stored in the at least one non-volatile memory unit is transferred to a processor configured to execute an ESP.

23. The system of claim 20, further comprising:
 a remote communication unit coupled to the data bus, the remote communication unit transmitting vehicle position data to a remote location.

24. The system of claim 20, wherein the electronic control unit estimates a longitudinal acceleration of the vehicle at a plurality of instants in time using the ESP and estimates the trajectory of the vehicle by numerically integrating lateral acceleration data and the longitudinal acceleration parameters over time, the integration yielding position values along stationary x and y axes.

* * * * *